Dec. 21, 1948.  K. V. ANDERSON  2,456,668
OIL CIRCULATING MEANS FOR PISTONS
AND CONNECTING RODS
Filed Sept. 18, 1946  2 Sheets-Sheet 1
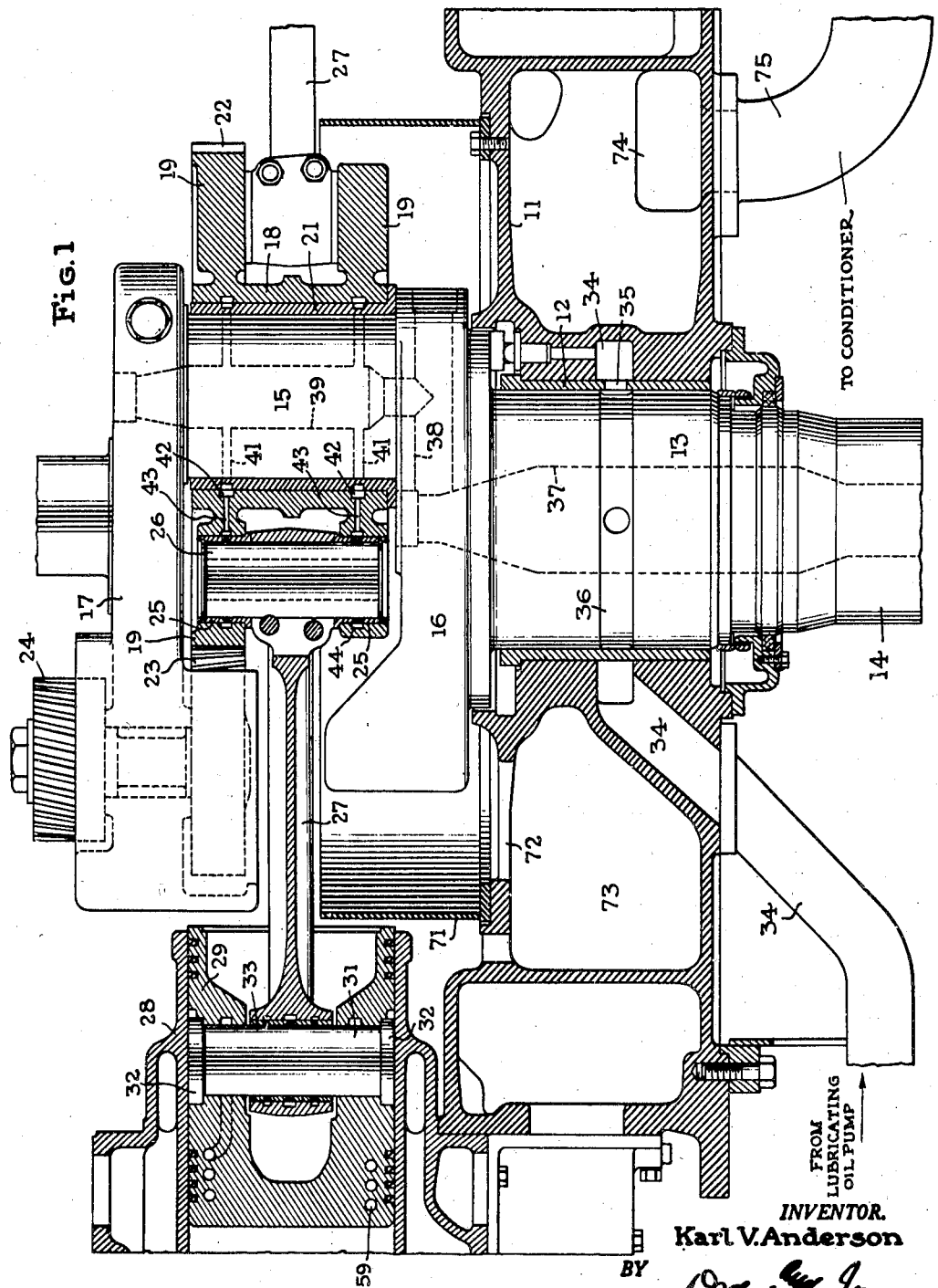
INVENTOR.
Karl V. Anderson
BY
Attorneys Dec. 21, 1948.    K. V. ANDERSON    2,456,668
OIL CIRCULATING MEANS FOR PISTONS
AND CONNECTING RODS
Filed Sept. 18, 1946    2 Sheets-Sheet 2
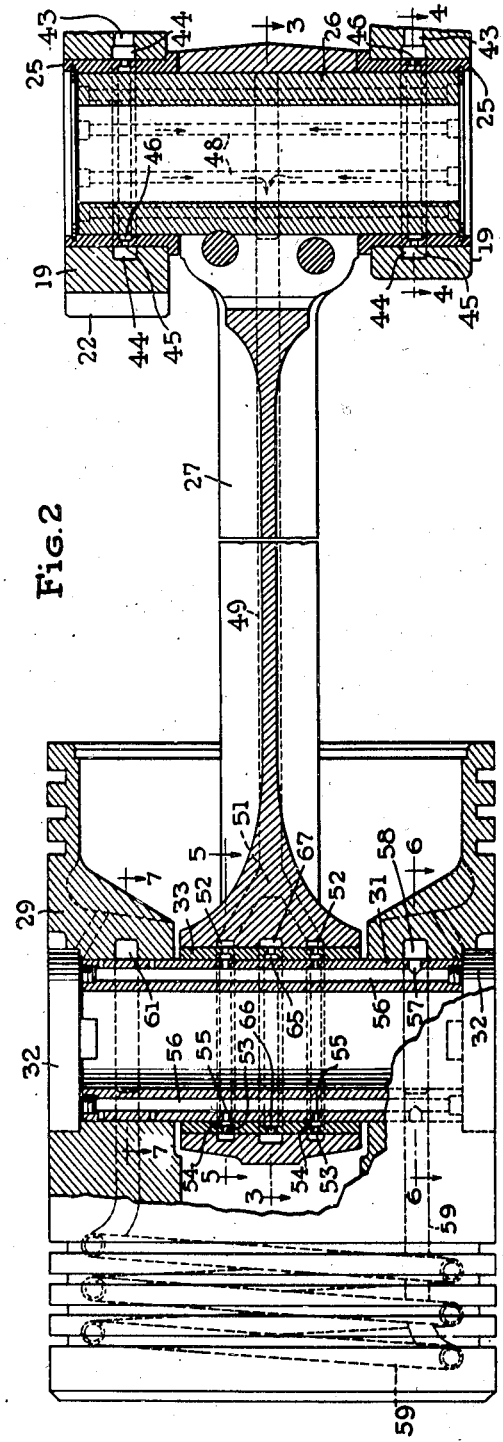
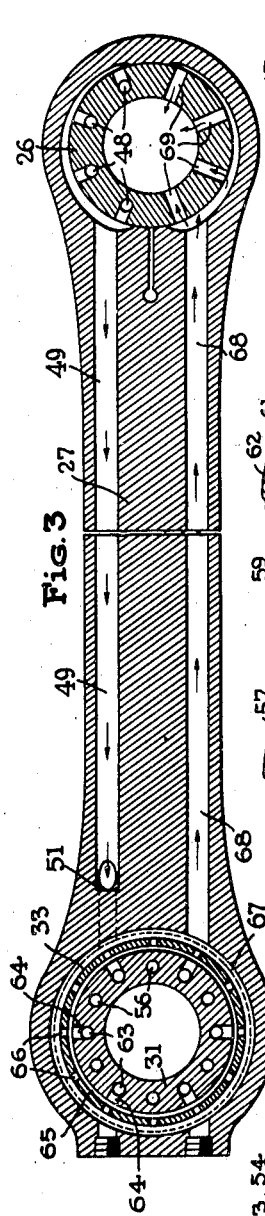
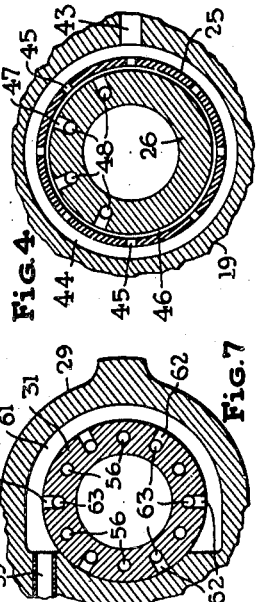
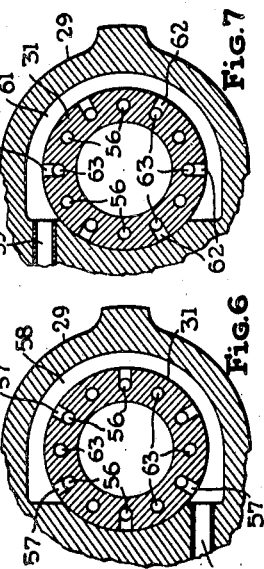
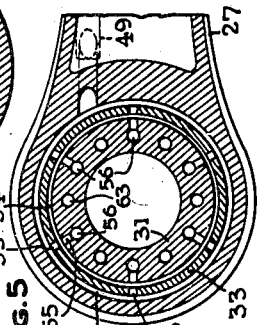
INVENTOR.
Karl V. Anderson
BY
Attorneys Patented Dec. 21, 1948

2,456,668

UNITED STATES PATENT OFFICE 2,456,668

OIL CIRCULATING MEANS FOR PISTONS AND CONNECTING RODS

Karl V. Anderson, Milwaukee, Wis., assignor to Nordberg Manufacturing Co., Milwaukee, Wis., a corporation of Wisconsin Application September 18, 1946, Serial No. 697,775

4 Claims. (Cl. 123—176)

1

This invention relates to means for cooling the pistons of internal combustion engines by means of oil which lubricates the crank pin and wrist pin bearings.

It is known practice to cool the piston by oil fed under pressure through the connecting rod. In such case the usual practice has been to discharge the oil from the piston through a port that allowed the oil to fall freely to the crank case, an arrangement which is entirely workable with vertical engines. It is not satisfactory with engines having inclined or horizontal cylinders (for example), because the hot oil leaving the piston should at least be cooled before it reaches any part requiring lubrication.

According to the present invention the oil is fed through the crank and connecting rod to the piston, feeding the crank pin and wrist pin bearings on its way. From the piston the oil follows a different path through the connecting rod so arranged that when the oil passes the wrist pin bearing differential pressures will resist entrance of hot oil into the bearing. The hot oil discharges from the crank end pin without reaching its bearings. From the crank end pin the oil discharges into a collector that leads it to a "conditioning" device which may merely cool the oil, though filtering and centrifuging steps are obvious possibilities. The invention is not concerned with the treatment to be used to improve the properties of the oil.

The invention is of general applicability, but merely as a basis of explanation, will be described as embodied in a multicylinder radial engine having a vertical crank shaft, and a crank ring which revolves with the crank but does not rotate. This particular crank arrangement is described and claimed in my copending application Serial No. 692,982, filed August 26, 1946. To an extent it complicates the problem of transmitting the oil to the pistons and hence offers a favorable opportunity to indicate the adaptability of the invention and illustrate features developed for the particular exigencies presented by the design.

The invention will now be described by reference to the accompanying drawing, in which:

Fig. 1 is a vertical axial section of enough of the engine to show the crank shaft and crank, a main bearing, the non-rotating crank ring and one complete piston-connecting-rod unit.

Fig. 2 is a view of a piston-connecting-rod unit drawn on a larger scale than Fig. 1 and chiefly in axial section, to show the porting.

Fig. 3 is a section on the line 3—3 of Fig. 2.

Figs. 4 to 7, inclusive, are respectively fragmentary sections on the lines 4—4, 5—5, 6—6 and 7—7 of Fig. 2.

A portion of the engine frame appears at 11 and supports a main bearing 12 in which one journal 13 of crank shaft 14 turns. Shaft 14 extends downward to connect with driven apparatus, not shown.

Shaft 14 carries a crank pin 15 between counterweighted throws 16 and 17, and this turns in a non-rotating revolving ring made up of a sleeve 18 and two spaced flanges 19. There is the usual bearing bushing 21. The teeth 22 in the upper flange 19 and the two pinions 23, 24 are part of a planetary gear train used to inhibit rotation of the ring while permitting it to revolve. The invention is not directly concerned with this detail.

Rotating in bearing bushings 25 in the flanges 19 are hollow tubular pins 26, which are clamped in the crank ends of connecting rods 27. There is one for each cylinder, and the engine here illustrated has eleven radially arranged cylinders 28, only one of which appears in Fig. 1. The way in which pins 26 are mounted forms the subject of my copending patent application, above identified.

Each cylinder 28 has a piston 29 with wrist pin 31 fixed therein by retainer heads 32. Each rod 27 has a bearing bushing 33 which works on the corresponding wrist pin.

The general organization of the engine being understood, the oil paths can now be traced.

A lubricating pump (not shown) delivers oil under pressure to conduit 34 which leads to port 35 in main bearing 12. This registers with groove 36 in journal 13, from which a passage 37, 38, 39 leads to radial ports 41 in crank pin 15. These communicate through grooves 42 with radial ports 43 in the flanges 19 of the revolving ring.

All oil passages so far described conform to known practice and are shown in Fig. 1. Refer now to Figs. 2-7 and particularly Figs. 2 and 3.

The ports 43 enter annular grooves 44 (see Fig. 4) which are formed in flanges 19 and encircle bearing bushings 25. They lead to radial ports 45, through the bushing. These feed grooves 46 in bushing 25 communicate with four drilled ports 48 in pin 26 by way of radial passages 47 (see Fig. 4). Ports 48 (see Fig. 3) lead to passage 49 which extends the length of rod 27, branches at 51 and so leads to two grooves 52 which encircle the wrist pin bushing 33 (see Figs. 2 and 5).

As best shown in Fig. 5, the flow is from grooves 52 through radial ports 53 to groove 54 cut in bushing 33 and thence by radial ports 55 in the wrist pin 31 to six longitudinal ports 56 in the wrist pin 31. These are connected by radial ports 57 and groove 58 (see Figs. 2 and 6) with the entrance end of the cooling coil 59 cast in the piston 29 (see Fig. 2).

The exit end of coil 59 (see Fig. 7) is connected by groove 61 and radial ports 62 with longitudinal passages 63, six in number, interspersed between ports 56. The passages 63 (see Fig. 3) have one set of radial ports 64 which lead to annular groove 65 cut in bushing 33 and thence through ports 66 also in bearing bushing 33 to annular groove 67 which is formed in rod 27 and leads to longitudinal passage 68 (see Fig. 3) in rod 27. This leads through four radial ports 69 through pin 26 to the bore of that pin.

Refer now to Fig. 1. Oil discharging from the bore of the various pins 26 is thrown out against baffle 71 and drains through port 72, chamber 73 and port 74 to the conduit 75 which leads to an oil-reconditioning means of any suitable type (not shown).

Thus, hot oil discharging from the pistons flows to the conditioner without reaching any lubricated part. The nearest approach to contact is at groove 65, but back pressure in groove 65 is slightly lower than pressure of the cool oil in adjacent grooves 54, so that the cool oil will seep across and resist entrance of the hot oil into the wrist pin bearing. There is some short circuit flow at this point and the action is desirable because whatever oil tends to enter is cool and acts to sweep out hot oil.

The arrangement affords adequate cylinder cooling with strict control of the hot oil. It requires no accessories such as trombone connections, which cannot be used successfully with high speed engines.

As stated, the described embodiment is illustrative of the invention, which is applicable to other types of engine and would of course be modified to suit.

What is claimed is:

1. The combination with a piston, connecting rod and crank mechanism of a connection for supplying oil under pressure; a cooling passage in the piston; communicating passages in the crank and connecting rod fed by said supply connection, and serving to conduct oil under pressure to the entrance end of the passage in the piston; a distinct passage in the connecting rod leading from the exit end of said passage in the piston to a discharge near the crank; and oil-collecting means having a portion encircling the orbit of the crank and arranged to intercept discharging oil.

2. The combination of a crank having an oil passage; a connection for supplying oil under pressure thereto; a revolving ring journaled in the crank and having an oil passage communicating with the passage in the crank; at least one piston and connecting rod unit in which the rod has a wrist pin bearing connection with the piston and a journal pin bearing connection with the ring; means for lubricating said bearings and cooling the piston comprising a passage which leads from the passage in the ring, through the rod in communication with both pin bearings, thence through the piston and back through the rod to an outlet located substantially at the journal pin; and oil-collecting means having a portion encircling the orbit of the ring and arranged to intercept discharging oil.

3. The combination defined in claim 2 in which the journal pin is tubular and fixed in the rod, and the return passage discharges into the bore of the pin, escapes freely from the end thereof and thus by-passes the journal pin bearing.

4. The combination of a piston having an oil cooling passage; a connecting rod having an oil supply passage and an oil return passage; a wrist pin forming a connecting bearing between the piston and connecting rod, said pin having passages which connect the oil supply and oil return passages in the rod with opposite ends of the oil cooling passage in the piston and which respectively communicate at spaced points with the wrist pin bearing; and connections for supplying oil under pressure to said supply passage, the parts being so proportioned and arranged that flowing oil is subjected to a substantial pressure drop as it flows through the piston passage, whereby pressure developed in the wrist pin bearing by oil from the supply passage will resist entrance into the bearing of oil from the return passage.

KARL V. ANDERSON.

REFERENCES CITED

The following references are of record in the file of this patent:

UNITED STATES PATENTS

| Number | Name | Date |
|---|---|---|
| 2,134,811 | Church | Nov. 1, 1938 |

FOREIGN PATENTS

| Number | Country | Date |
|---|---|---|
| 838,632 | France | 1938 |
| 841,761 | France | 1938 |